United States Patent
Zhang et al.

(10) Patent No.: US 11,407,674 B2
(45) Date of Patent: Aug. 9, 2022

(54) COMPOSITION FOR GLASS, ALKALINE-EARTH ALUMINOSILICATE GLASS, AND PREPARATION METHOD AND APPLICATION THEREOF

(71) Applicants: TUNGHSU TECHNOLOGY GROUP CO., LTD., Beijing (CN); TUNGHSU GROUP CO., LTD., Shijiazhuang (CN)

(72) Inventors: Guangtao Zhang, Shijiazhuang (CN); Junfeng Wang, Shijiazhuang (CN); Gang Li, Shijiazhuang (CN); Peng Tian, Shijiazhuang (CN); Dongcheng Yan, Shijiazhuang (CN); Lihong Wang, Shijiazhuang (CN); Quan Zheng, Shijiazhuang (CN)

(73) Assignees: TUNGHSU TECHNOLOGY GROUP CO., LTD., Beijing (CN); TUNGHSU GROUP CO., LTD., Shijiazhuang (CN)

( * ) Notice: Subject to any disclaimer, the term of this patent is extended or adjusted under 35 U.S.C. 154(b) by 468 days.

(21) Appl. No.: 16/606,449

(22) PCT Filed: Apr. 9, 2018

(86) PCT No.: PCT/CN2018/082339
§ 371 (c)(1),
(2) Date: Oct. 18, 2019

(87) PCT Pub. No.: WO2018/192380
PCT Pub. Date: Oct. 25, 2018

(65) Prior Publication Data
US 2021/0107825 A1    Apr. 15, 2021

(30) Foreign Application Priority Data
Apr. 18, 2017 (CN) .......................... 201710252601.5

(51) Int. Cl.
C03C 3/087 (2006.01)
C03C 1/00 (2006.01)
C03C 25/00 (2018.01)
C03B 19/02 (2006.01)
C03B 25/02 (2006.01)

(52) U.S. Cl.
CPC .............. C03C 3/087 (2013.01); C03C 1/004 (2013.01); C03B 19/02 (2013.01); C03B 25/02 (2013.01)

(58) Field of Classification Search
CPC .......... C03C 3/085; C03C 3/087; C03C 1/004
See application file for complete search history.

(56) References Cited

U.S. PATENT DOCUMENTS

| | | | | |
|---|---|---|---|---|
| 5,785,726 | A | * | 7/1998 | Dorfeld .................. C03C 3/091 65/157 |
| 5,811,361 | A | | 9/1998 | Miwa |
| 5,824,127 | A | * | 10/1998 | Bange .................... C03C 3/091 65/193 |
| 6,417,124 | B1 | | 7/2002 | Peuchert et al. |
| 2014/0179510 | A1 | * | 6/2014 | Allan ..................... C03C 3/093 501/67 |
| 2018/0044223 | A1 | | 2/2018 | Hayashi |

FOREIGN PATENT DOCUMENTS

| | | |
|---|---|---|
| CN | 103910487 A | 7/2014 |
| CN | 104326662 A | 2/2015 |
| CN | 105164068 A | 12/2015 |
| CN | 105452182 A | 3/2016 |
| CN | 105645762 A | 6/2016 |
| CN | 107032604 A | 8/2017 |
| EP | 1078893 A2 | 2/2001 |
| TW | 201247584 A1 | 12/2012 |
| WO | 2015056645 A1 | 4/2015 |
| WO | 2016049400 A1 | 3/2016 |
| WO | 2016/143665 A1 | 9/2016 |

OTHER PUBLICATIONS

Liu Yin et al., "Inorganic Non-Metallic Materials Technology", China University of Science and Technology Press, Sep. 2015, p. 297.
Tian Yingliang et al., "New Glass Technology", China Light Industry Press, Aug. 2013, pp. 135, 240-249.

* cited by examiner

*Primary Examiner* — Elizabeth A. Bolden
(74) *Attorney, Agent, or Firm* — Volpe Koenig

(57) ABSTRACT

A composition for glass, alkaline earth aluminosilicate glass, and a preparation method therefor and applications thereof. Based on the total number of moles of each component and the counting of oxides, the composition contains 68-73 mol % of $SiO_2$, 11.5-15 mol % of $Al_2O_3$, 2-6 mol % of MgO, 2.5-7.5 mol % of CaO, 0-3 mol % of SrO, 2-7 mol % of BaO, 0-4 mol % of ZnO and 0.05-1.5 mol % of $TiO_2$. The glass has a high strain point, a high Young's modulus, a high specific modulus, a high Vickers hardness, high chemical stability, a high refractive index and high glass formation stability, and has a lower forming temperature, a lower melting temperature, a lower thermal expansion coefficient, a lower surface tension, a lower density, and low glass manufacturing difficulty.

19 Claims, No Drawings

US 11,407,674 B2

COMPOSITION FOR GLASS, ALKALINE-EARTH ALUMINOSILICATE GLASS, AND PREPARATION METHOD AND APPLICATION THEREOF

CROSS REFERENCE TO RELATED APPLICATIONS

This application is a 35 USC § 371 national stage of PCT/CN2018/082339, which was filed Apr. 9, 2018, claims priority to Chinese Application No. 201710252601.5, filed on Apr. 18, 2017, and is entitled "COMPOSITION FOR GLASS, ALKALI ALUMINOSILICATE GLASS, AND PREPARATION METHOD THEREFOR AND APPLICATIONS THEREOF," both of which are incorporated herein by reference as if fully set forth.

FIELD

The present invention relates to the field of glass manufacturing, in particular to a composition for glass, an alkaline-earth aluminosilicate glass, a preparation method and an application thereof.

BACKGROUND

As the photovoltaic industry is developed rapidly, the demand for various display devices is increasing, such as active matrix liquid crystal display (AMLCD) devices, organic light emitting diode (OLED) devices, and active matrix liquid crystal display devices using low temperature polycrystalline silicon technology (LTPS TFT-LCD), all of which are based on thin film transistors (TFT) produced from a thin film semiconductor material. Mainstream silicon-based TFTs can be categorized into amorphous silicon (a-Si) TFT, polycrystalline silicon (p-Si) TFT and single crystal silicon (SCS) TFT, among which the amorphous silicon (a-Si) TFT is the main TFT-LCD application technique presently. The amorphous silicon (a-Si) TFT technique can be applied at 300-450° C. treating temperature in the production process. The LTPS polycrystalline silicon (p-Si) TFT has to be treated at higher temperatures for many times in the production process, and the substrate shall have no deformation in the repeated high-temperature treatment process, which brings higher requirements for the performance indexes of the substrate glass. The strain point is preferably higher than 650° C., more preferably higher than 670° C., 700° C. or 720° C., in order to minimize the thermal shrinkage of the substrate in the panel manufacturing process. In addition, the expansion coefficient of the glass substrate shall be close to the expansion coefficient of silicon, so as to minimize stress and damage. Therefore, the linear thermal expansion coefficient of the substrate glass is preferably $28{\sim}40{\times}10^{-7}/°$ C. In order to facilitate production and reduce production costs, the glass used as the display substrate shall have lower melting temperature and forming temperature.

The glass substrate for flat panel display has to be coated with a transparent conducting film, an insulating film, a semiconductor film (polycrystalline silicon or amorphous silicon, etc.), and a metal film on the surface of the substrate glass by sputtering and chemical vapor deposition (CVD), etc., and then photo-etched with a photo-etching technique to form various circuits and patterns. If the glass contains any alkali oxide ($Na_2$, $K_2O$, or $Li_2O$), the alkali metal ions will diffuse into the deposited semiconductor materials in the heat treatment process, causing degraded properties of the semiconductor film. Therefore, the glass shall not contain any alkali oxide, and preferably is alkaline-earth aluminosilicate glass mainly composed of $SiO_2$, $Al_2O_3$ and alkaline-earth oxide RO (RO=Mg, Ca, Sr, or Ba), etc.

Most types of silicate glass have a strain point that increases as the content of glass formers increases and the content of modifiers decreases. However, on one hand, in the melting and fining temperature zone, increased content of glass formers and decreased content of modifiers will cause high-temperature melting and fining difficulties, aggravated corrosion of refractory materials, and increased energy consumption and production costs; on the other hand, in the forming temperature zone, increased content of glass formers and decreased content of modifiers will cause increased liquidus temperature and severely increased probability of solid defects such as devitrification, consequently will cause compromised stability of glass formation, and are adverse to industrial mass manufacturing and result in decreased practicability of the glass material. Therefore, the best way for improving the strain point is to increase the low-temperature viscosity by component improvement while preventing significant increase of the high-temperature viscosity, so as to effectively control the liquidus temperature and improve the stability of glass formation.

By adding boron oxide $B_2O_3$ into a high-alumina alkali-free silicate glass system, a good melting acceleration effect can be attained, and the chemical resistance of the glass can be improved as well. However, in the low-temperature viscosity zone, $B_2O_3$ causes a severely decreased strain point of the glass. How to improve the chemical resistance and the temperature of strain point of the glass substrate at the same time has been a great challenge faced by those skilled in the art for a long time.

In the manufacturing process of a glass substrate, the glass substrate is placed horizontally, and has certain sag proportional to the density of the glass and inversely proportional to the elastic modulus of the glass under the self-weight of the glass. As the substrate manufacturing is developed in a trend of large area and thin profile, attention must be paid to the sag of the glass substrate in the manufacturing process. Therefore, on one hand, the composition of the substrate glass shall be designed in a way that the substrate glass has lower density and higher elastic modulus as far as possible. On the other hand, in order to reduce surface scratches of glass substrate during transportation, conveying, manufacturing and use, the glass substrate shall have Vickers hardness that is as high as possible.

As smartphones and tablet PCs are popularized, an era of intelligent mobility has come. In the past, mobile phones were limited to communication functions. However, presently, the performance of intelligent devices, including smart phones and tablet PCs, is close to that of notebook computers, which enables people to carry out and enjoy high-level business and entertainment activities at any time by virtue of the convenience of wireless communication. In such a trend, the requirements for display performance are also increasing, especially for image quality and outdoor visual performance of mobile intelligent devices. At the same time, in order to reduce the burden during the use of hand-held devices, lighter weight and thinner profile become an inevitable trend. Under the guidance of that trend, display panels are developed towards light weight and super-high definition display, and panel manufacturing processes are developed towards higher treating temperature; at the same time, the thickness of a single piece of glass treated through the manufacturing process can be 0.25 mm, 0.2 mm, 0.1 mm, or even smaller. At present, the main way to make glass thinner is chemical thinning. Specifically, the glass substrate is corroded by a hydrofluoric acid or hydrofluoric acid buffer solution, under the following thinning principle:

Primary chemical reaction: $4HF+SiO_2=SiF_4+2H_2O$

Secondary chemical reaction: $RO+2H^+=R^{2+}+H_2O$ (R represents alkaline earth metal, etc.)

The chemical thinning process and the surface quality of the thinned glass substrate have certain relation with the basic glass composition. The existing TFT-LCD substrate glass often has some defects such as "pits" and "bumps" in the chemical thinning process, which cause increased production costs. Glass with high chemical stability has better surface quality after the thinning. Therefore, developing TFT-LCD substrate glass with high chemical stability can reduce production costs (e.g., cost of secondary polishing, etc.), improve product quality and yield, and is of great benefit for mass industrial production.

As substrate glass is developed in the trend of light weight and thin profile, in the production of more advanced generations of glass substrates, such as G5, G6, G7 and G8, etc., the sag and warpage of the horizontally laid glass substrate under self-weight has become a major research subject. For the producers of glass substrates, since the glass sheets are to be annealed, cut, machined, inspected and cleaned after forming, the sag of large-size glass substrates will affect the ability of glass loading, removal and separation in the boxes for transportation between processing sites. Similar problems also exist for panel manufacturers. Larger sag or warpage will result in a higher damage rate and warnings in the CF process, seriously affecting product yield. If a glass substrate is supported on both sides at two ends, the maximum sag (S) of the glass substrate may be expressed with the following formula (I):

$$S = k * \left(\frac{l^4}{t^4}\right) * \left(\frac{\rho}{E}\right) \quad \text{Formula (I)}$$

Wherein k is a constant, ρ is the density, E is the elastic modulus, l is the support spacing, and t is the thickness of the glass substrate. Wherein, (ρ/E) is the reciprocal of specific modulus. The specific modulus is the ratio of the elastic modulus to the density of a material, also referred to as "specific elastic modulus" or "specific stiffness", and is one of the major criteria for the structural design of the material. A higher specific modulus indicates lighter weight of the material with the same stiffness or higher stiffness of the material with the same mass. It is seen from the above formula: when l and t are fixed, the sag can be reduced as ρ is decreased and E is increased. Therefore, the substrate glass shall have density that is as low as possible and an elastic modulus that is as high as possible, i.e., have a specific modulus that is as high as possible. Thinned glass may have deformation more easily owing to decreased mechanical strength resulted from significantly decreased thickness. Decreasing density, increasing specific modulus and strength, and decreasing glass brittleness have become major considerations of glass producers.

Besides, improving the refractivity of glass substrate properly without severely increasing the manufacturing cost is beneficial for the light extraction efficiency of OLED lighting or display devices.

In order to obtain bubble-free alkali-free glass, a fining gas is used to expel the gas generated during glass reaction from the glass melt. In addition, the generated fining gas is used again to increase the bubble diameter and make the bubble float up during homogenized melting, so as to extract the micro-bubbles involved.

However, since the glass melt used as the glass substrate for flat panel display has high viscosity, it has to be melted at a higher temperature. In such a glass substrate, glass transition reaction is usually induced at 1,300-1,500° C., and de-bubbling and homogenization are usually carried out at temperatures above 1,500° C. Therefore, $As_2O_3$ that can produce a fining gas in a wide temperature range (1,300-1,700° C.) is widely used as fining agents. However, $As_2O_3$ is highly toxic, and may pollute the environment and bring troubles related with health in the glass manufacturing process or waste glass treatment process. Therefore, the use of $As_2O_3$ is restricted presently. Some researchers have tried to replace arsenic fining with antimony fining. However, antimony itself has problems related with the environment and health. $Sb_2O_3$ is still toxic, although it is not as highly toxic as $As_2O_3$. In addition, compared with arsenic, antimony produces a fining gas at a lower temperature, and it is less effective to remove such glass bubbles.

SUMMARY

To solve the above-mentioned problems in the prior art, the present invention provides a composition for glass, an alkaline-earth aluminosilicate glass, and a preparation method and an application thereof.

To attain the above-mentioned objects, in a first aspect, the present invention provide a composition for glass comprising, based on the total number of moles of the components, on an oxide basis, 68-73 mol % $SiO_2$, 11.5-15 mol % $Al_2O_3$, 2-6 mol % MgO, 2.5-7.5 mol % CaO, 0-3 mol % SrO, 2-7 mol % BaO, 0-4 mol % ZnO, and 0.05-1.5 mol % $TiO_2$.

Preferably, based on the total number of moles of the components, on an oxide basis, $SiO_2+Al_2O_3>80$ mol %.

Preferably, based on the total number of moles of the components, the contents of the components calculated in mole percent in the composition meet I>0, further preferably is 0.5-50, even further preferably is 0.59-33.85, even more further preferably is 0.59-21.6, still further preferably is 2-13.5, wherein the I value is calculated with the following formula:

$I=[SiO_2-P_1 \times Al_2O_3-P_2 \times BaO-P_3 \times (MgO+ZnO)-P_4 \times (CaO+SrO)-P_5 \times TiO_2] \times 100$, Wherein $P_1=4$, $P_2=-2$, $P_3=3.5$, $P_4=3$, and $P_5=-25$, $SiO_2$, $Al_2O_3$, MgO, CaO, SrO, BaO, ZnO, and $TiO_2$ represent the mole percent of the corresponding component in the overall composition respectively.

Preferably, based on the total number of moles of the components, in mole percent, 0.8≥(MgO+BaO)/R'O≥0.34, further preferably 0.75≥(MgO+BaO)/R'O≥0.45, even further preferably 0.7≥(MgO+BaO)/R'O≥0.5, wherein R'O=MgO+CaO+SrO+BaO+ZnO.

Preferably, based on the total number of moles of the components, in mole percent, 0.6≤$Al_2O_3$/R'O≤1; further preferably 0.65≤$Al_2O_3$/R'O≤0.95; even further preferably 0.7≤$Al_2O_3$/R'O≤0.85; still further preferably 0.7<$Al_2O_3$/R'O<0.8, wherein R'O=MgO+CaO+SrO+BaO+ZnO.

Preferably, based on the total number of moles of the components, on an oxide basis, the content of ZnO is 0.4-3 mol %.

Preferably, based on the total number of moles of the components, on an oxide basis, the content of $Al_2O_3$ is 11.7-12.8 mol %.

Preferably, based on the total number of moles of the components, on an oxide basis, the content of $SiO_2$ is 68-72.2 mol %.

Preferably, based on the total number of moles of the components, on an oxide basis, the content of MgO is 2.35-5 mol %.

Preferably, based on the total number of moles of the components, on an oxide basis, the content of CaO is 3.4-7.3 mol %.

Preferably, based on the total number of moles of the components, on an oxide basis, the content of SrO is 0-2.61 mol %.

Preferably, based on the total number of moles of the components, on an oxide basis, the content of BaO is 2.3-5.8 mol %.

Preferably, based on the total number of moles of the components, on an oxide basis, the content of $TiO_2$ is 0.05-1.2 mol %.

Preferably, the composition further contains a fining agent, which preferably is at least one of sulfate, nitrate, stannic oxide, stannous oxide, chloride, and fluoride; based on the total number of moles of the components, on an oxide basis, the content of the fining agent is 0.04-0.15 mol %.

In a second aspect, the present invention provides a method for preparing alkaline-earth aluminosilicate glass comprising treating the composition for glass according to the present invention by melting, forming, annealing, and machining sequentially.

In a third aspect, the present invention provides alkaline-earth aluminosilicate glass prepared with the method according to the present invention.

Preferably, the density of the alkaline-earth aluminosilicate glass is smaller than 2.67 $g/cm^3$.

Preferably, the Young's modulus of the alkaline-earth aluminosilicate glass is greater than 75 GPa.

Preferably, the specific modulus of the alkaline-earth aluminosilicate glass is greater than 29 $GPa/(g/cm^3)$.

Preferably, the refractivity $n_D$ of the alkaline-earth aluminosilicate glass is greater than 1.53.

Preferably, the thermal expansion coefficient of the alkaline-earth aluminosilicate glass at 50-350° C. is smaller than $39 \times 10^{-7}$/° C.

Preferably, the forming temperature $T_w$ of the alkaline-earth aluminosilicate glass corresponding to 35,000 P viscosity is lower than 1,320° C.

Preferably, the melting temperature $T_m$ of the alkaline-earth aluminosilicate glass corresponding to 200 P viscosity is lower than 1,650° C.

Preferably, the liquidus temperature $T_l$ of the alkaline-earth aluminosilicate glass is lower than 1,220° C.

Preferably, the strain point $T_{st}$ of the alkaline-earth aluminosilicate glass is 750° C. or above.

Preferably, the annealing point $T_a$ of the alkaline-earth aluminosilicate glass is 790° C. or above.

Preferably, the glass formation stability factor D of the alkaline-earth aluminosilicate glass is smaller than 1.0, further preferably is 0.5-0.95, even further preferably is 0.59-0.84, still further preferably is 0.62-0.74, wherein the D I values calculated with the following formula:

$$D=(T_f-T_a)/(T_m-T_l),$$

Wherein $T_m$, $T_l$ and $T_a$ respectively represent the melting temperature, liquidus temperature, and annealing point temperature of the glass corresponding to 200 P viscosity. Those skilled in the art should understand: a smaller D I valuendicates stronger devitrification resistant ability of the glass, higher stability of glass formation, and lower manufacturing difficulty; a lower D I valuendicates weaker devitrification resistant ability of the glass, lower stability of glass formation, and higher manufacturing difficulty.

Preferably, the surface tension of the alkaline-earth aluminosilicate glass at 1,200° C. is smaller than 350 mN/m.

Preferably, the Vickers hardness of the alkaline-earth aluminosilicate glass is greater than 6.4 GPa.

Preferably, the number of bubbles having bubble diameter>0.1 mm per Kg glass substrate is so low that the bubbles are invisible.

In a fourth aspect, the present invention provides an application of the composition for glass or alkaline-earth aluminosilicate glass according to the present invention in preparation of a display device and/or solar cell, preferably an application in preparation of a glass substrate material and/or a glass film material for screen surface protection of flat panel display products, a glass substrate material and/or glass material for surface packaging and/or glass film material for screen surface protection of flexible display products, or a glass substrate material of flexible solar cells.

The composition for glass provided in the present invention belongs to an alkaline-earth aluminosilicate glass system, and is of a composition design of an environment-friendly highly heat-resistant glass substrate with better and more perfect properties. It provides a formulation of glass substrate in which no surface defect exists even if the fining agent doesn't employ $As_2O_3$ and/or $Sb_2O_3$. Alkali-free glass is obtained with the design, and the glass substrate prepared with that formulation conform to environmental requirements, doesn't contain $As_2O_3$, $Sb_2O_3$ or any compound thereof, doesn't contain alkali metal, rare earth oxide, or $B_2O_3$, has higher strain point, higher Young's modulus, higher specific modulus, higher Vickers hardness, higher chemical stability, higher refractivity, higher stability of glass formation, lower forming temperature, lower melting temperature, lower thermal expansion coefficient, lower surface tension and lower density, is in line with the developing trend of the flat panel display industry, is applicable to production and manufacturing of glass through a down-draw fusion method or float process, etc. The prepared glass can be widely applied in industries such as photoelectric display, lighting, and photovoltaic device, etc.

Specifically, the present invention has the following beneficial effects:

(1) The glass prepared in the present invention is environment friendly, and free of any toxic substance. According to a preferred embodiment, the fining agent employs stannous oxide SnO, which is widely available and known as non-toxic. When stannous oxide SnO is used solely as a glass fining agent, a wide temperature range for producing a fining gas is available, and the fining agent is suitable for removal of bubbles in the glass.

(2) According to a preferred embodiment of the present invention, the composition for glass contains $SiO_2$, $Al_2O_3$, MgO, CaO, SrO, BaO, ZnO and $TiO_2$ in specific contents, the content of $SiO_2+Al_2O_3$ is controlled to be >80 mol %, the I value is >0, 0.8≥(MgO+BaO)/R'O≥0.34, and 0.6≤$Al_2O_3$/R'O≤1. Thus, the prepared glass has excellent properties, such as higher strain point, higher Young's modulus, higher specific modulus, higher Vickers hardness, higher chemical stability, higher stability of glass formation, lower forming temperature, lower melting temperature, and lower liquidus temperature, etc. Specifically, the density of the obtained alkaline-earth aluminosilicate glass is smaller than 2.67 g/cm$^3$, the Young's modulus is greater than 75 GPa, the specific modulus is greater than 29 GPa/(g/cm$^3$), the thermal expansion coefficient at 50-350° C. is smaller than 39×10$^{-7}$/° C., the refractivity n$_D$ is greater than 1.53, the forming temperature T$_w$ corresponding to 35,000 P viscosity is lower than 1,320° C., the melting temperature T$_m$ corresponding to 200 P viscosity is lower than 1,650° C., the liquidus temperature T$_l$ is lower than 1,220° C., the strain point T$_{st}$ is 750° C. or above, the annealing point T$_a$ is 790° C. or above, the glass formation stability factor D is smaller than 1.0, the surface tension at 1,200° C. is smaller than 350 mN/m, the Vickers hardness is greater than 6.4 GPa, and the number of bubbles having bubble diameter>0.1 mm per Kg glass substrate is so low that the bubbles are invisible.

(3) Since the composition in the present invention has high content of SiO$_2$ and Al$_2$O$_3$ and doesn't contain B$_2$O$_3$, a high strain point is ensured; utilizing the high content of SiO$_2$ and Al$_2$O$_3$ working with MgO+CaO+SrO+BaO+ZnO+TiO$_2$ in certain proportions, the melting temperature can be effectively decreased, the stability of glass formation can be improved, and the glass manufacturing difficulty can be reduced, a great space for improving product yield is obtained, and the product costs in fuel and electric power, etc. can be reduced.

DETAILED DESCRIPTION

The ends points and any I valuen the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provide a composition for glass comprising, based on the total number of moles of the components, on an oxide basis, 68-73 mol % SiO$_2$, 11.5-15 mol % Al$_2$O$_3$, 2-6 mol % MgO, 2.5-7.5 mol % CaO, 0-3 mol % SrO, 2-7 mol % BaO, 0-4 mol % ZnO, and 0.05-1.5 mol % TiO$_2$.

In the present invention, those skilled in the art should understand that "alkali-free" refers to that the composition for glass or the glass doesn't contain any alkali metal (i.e., any of the six alkali metal elements in the group IA in the periodic table of elements).

In the composition according to the present invention, preferably, based on the total number of moles of the components, on an oxide basis, SiO$_2$+Al$_2$O$_3$>80 mol %.

In the composition according to the present invention, preferably, based on the total number of moles of the components, in mole percent, the contents of the components in the composition meet I>0, preferably is 0.5-50, further preferably is 0.59-33.85, even further preferably is 0.59-33.35, even more further preferably is 0.59-21.6, still further preferably is 2-13.5, optimally is 3.65-11.65, wherein the I value is calculated with the following formula:

$$I=[SiO_2-P_1\times Al_2O_3-P_2\times BaO-P_3\times(MgO+ZnO)-P_4\times(CaO+SrO)-P_5\times TiO_2]\times 100,$$

Wherein P$_1$=4, P$_2$=−2, P$_3$=3.5, P$_4$=3, and P$_5$=−25,

SiO$_2$, Al$_2$O$_3$, MgO, CaO, SrO, BaO, ZnO, and TiO$_2$ represent the mole percent of the corresponding component in the overall composition respectively.

In the composition according to the present invention, preferably, based on the total number of moles of the components, in mole percent, 0.8≥(MgO+BaO)/R'O≥0.34, further preferably 0.75≥(MgO+BaO)/R'O≥0.45, even further preferably 0.7≥(MgO+BaO)/R'O≥0.5, wherein R'O=MgO+CaO+SrO+BaO+ZnO.

In the composition according to the present invention, preferably, based on the total number of moles of the components, in mole percent, 0.6≤Al$_2$O$_3$/R'O≤1; further preferably 0.65≤Al$_2$O$_3$/R'O≤0.95; even further preferably 0.7≤Al$_2$O$_3$/R'O≤0.85; still further preferably 0.7<Al$_2$O$_3$/R'O<0.8, wherein R'O=MgO+CaO+SrO+BaO+ZnO.

In the present invention, SiO$_2$ is a glass former. If the content of SiO$_2$ is too low, it is disadvantageous for improving the resistance to chemical corrosion, the expansion coefficient will be too high, and devitrification may occur easily in the glass; increasing the content of SiO$_2$ is helpful for reducing the weight of the glass, decreasing the thermal expansion coefficient, increasing the strain point, and improving the chemical resistance, but the high-temperature viscosity will be increased at the same time. The increased high-temperature viscosity is adverse to melting, and can't be handled in ordinary kilns or furnaces. Therefore, the content of SiO$_2$ is determined as 68-73%. Hence, in comprehensive consideration, based on the total number of moles of the components, on an oxide basis, the content of SiO$_2$ is 68-73 mol %, preferably is 68-72.2 mol %.

In the present invention, Al$_2$O$_3$ is used to improve the strength of the glass structure. If the content of Al$_2$O$_3$ is lower than 11.5 mol %, it is difficult to improve the heat resistance of the glass, and the glass is susceptible to the erosion of environmental moisture and chemical reagents. Higher content of Al$_2$O$_3$ is helpful for increasing the strain point and mechanical strength of the glass. However, if the content of Al$_2$O$_3$ is too high, a devitrification phenomenon may occur in the glass, and it is difficult to melt the glass. Therefore, in comprehensive consideration, based on the total number of moles of the components, on an oxide basis, the content of Al$_2$O$_3$ is 11.5-15 mol %, preferably is 11.7-12.8 mol %.

In the present invention, MgO greatly increase the Young's modulus and hardness of the glass, decrease the high-temperature viscosity of the glass, and makes glass melting easier. In a case that the content of alkaline earth metals in alkali-free silicate glass, a local accumulation effect may be created in the structure and the short-range order span can be increased by introducing network-modifying ions Mg$^{2+}$ with high electric field intensity. In such a case, after a large quantity of intermediate oxide Al$_2$O$_3$ is introduced, the ions will exist in a state of [AlO$_4$]; since these polyhedrons carry negative charges, some network modifying cations are attracted, and the accumulation degree and devitrification ability of the glass are decreased; in a case that the content of alkaline earth metals is high and the network breakage is severe, by introducing MgO, the broken silicon-oxygen tetrahedrons will be reconnected and the devitrification ability of the glass will be decreased. Therefore, attention shall be paid to the ratios of MgO to other components. Compared with other alkali-earth oxides, the existence of MgO leads to lower expansion coefficient and density, higher chemical resistance, higher strain point and higher elastic modulus. If the content of MgO is greater than 6 mol %, the chemical resistance of the glass will be degraded, and devitrification may occur easily in the glass; if the content of MgO is too low, it will be adverse to the improvement of the specific modulus. Therefore, in comprehensive consideration, based on the total number of moles of the components, on an oxide basis, the content of the MgO is 2-6 mol %, preferably is 2.35-5 mol %.

In the present invention, CaO is used to promote glass melting and adjust glass forming. If the content of CaO is lower than 2.5 mol %, it is disadvantageous for decreasing the viscosity of the glass; if the content of CaO is too higher, devitrification may occur in the glass easily, and the thermal expansion coefficient will be increased significantly, adverse to the follow-up manufacturing procedures. Therefore, in comprehensive consideration, based on the total number of moles of the components, on an oxide basis, the content of CaO is 2.5-7.5 mol %, preferably is 3.4-7.3 mol %.

In the present invention, SrO is used as a fusing agent and used to prevent devitrification in the glass. If the content of SrO is too high, the glass density will be excessively high, resulting in excessive density of the product. Therefore, based on the total number of moles of the components, on an oxide basis, the content of SrO is 0-3 mol %, preferably is 0-2.61 mol %.

In the present invention, the role of BaO is similar to that of SrO. If the content of BaO is too high, the density of the glass will be increased excessively and the strain point will be decreased significantly. Therefore, based on the total number of moles of the components, on an oxide basis, the content of BaO is 2-7 mol %, preferably is 2.3-5.8 mol %.

In the present invention, the divalent metal oxides may be categorized into two types, according to their positions in the periodic table of elements and influences on the properties: one type of divalent metal oxides consist of alkali-earth oxides in the main group, the ion $R^{2+}$ of which has an eight outer electron structure; the other type of divalent metal oxides consist of metal oxides in the subgroups in the periodic table of elements (e.g., ZnO and CdO, etc.), the ion $R^{2+}$ of which has an eighteen outer electron structure. The structural states of the two types of divalent metal oxides in the glass have different influences on the properties of the glass. ZnO can decrease the high-temperature viscosity of the glass (e.g., 1,500° C.), and is helpful for eliminating bubbles; in addition, it has effects such as improving the strength and hardness of the glass, improving the chemical resistance of the glass, and decreasing the thermal expansion coefficient of the glass, at temperatures below the softening point. Adding ZnO in a proper amount into an alkali-free glass system is helpful for inhibiting devitrification and decreasing devitrification temperature. Theoretically, after ZnO is introduced as a network modifying element into alkali-free glass, it usually exists in the form of $[ZnO_4]$ at high temperatures, and the glass structure is looser than a glass structure that contains $[ZnO_6]$. Compared with ZnO-free glass in the same high temperature state, ZnO-containing glass has lower viscosity and higher atom movement speed. Therefore, crystal nuclei can't be formed in the ZnO-containing glass unless the temperature is decreased further. Therefore, ZnO decreases the upper limit of devitrification temperature in glass. If the content of ZnO is too high, the strain point of the glass will be decreased significantly. Therefore, in comprehensive consideration, based on the total number of moles of the components, on an oxide basis, the content of ZnO is 0-4 mol %, preferably is 0.4-3 mol %.

In the present invention, $TiO_2$ is used to promote glass melting and improve the stability of glass formation; in addition, the $TiO_2$ can effectively increase the refractivity of the glass and decrease the expansion coefficient of the glass. If the content of $TiO_2$ is excessively high, the above-mentioned effects will not be reduced significantly, and the stability of glass formation will be reduced. Therefore, in comprehensive consideration, based on the total number of moles of the components, on an oxide basis, the content of $TiO_2$ is 0.05-1.5 mol %, preferably is 0.05-1.2 mol %.

In the present invention, the composition further contains a fining agent, which preferably is at least one of sulfate, nitrate, stannic oxide, stannous oxide, chloride, and fluoride; wherein preferably stannous oxide SnO is added into the glass component as a fining agent or defrothing agent during glass melting, so as to improve glass melting. If the content of the fining agent is too high, devitrification may occur in the glass substrate. Therefore, preferably, based on the total number of moles of the components, on an oxide basis, the content of the fining agent is 0.04-0.15 mol %.

Those skilled in the art should understand that "the composition for glass in the present invention contains $SiO_2$, $Al_2O_3$, MgO, CaO, SrO, BaO, ZnO and $TiO_2$" means the composition contains Si-containing compounds, Al-containing compounds, Mg-containing compounds, Ca-containing compounds, Sr-containing compounds, Ba-containing compounds, Zn-containing compounds, and Ti-containing compounds. For example, the composition for glass contains carbonate, nitrate, sulfate, phosphates, basic carbonates, and oxides, etc. of the aforesaid elements. In addition, the contents of the aforesaid components are measured in the oxides of the elements, respectively. The specific selections of the carbonates, nitrates, sulfates, phosphates, basic carbonates, and oxides of the elements are well known to those skilled in the art, and will not be further detailed here.

When the composition for glass in the present invention is utilized to prepare alkaline-earth aluminosilicate glass, the obtained glass has excellent overall properties, mainly owing to the cooperation among the components, especially the cooperation among $SiO_2$, $Al_2O_3$, MgO, CaO, SrO, BaO, ZnO, and $TiO_2$, particularly the cooperation among the aforesaid components in specific contents.

In a second aspect, the present invention provides alkaline-earth aluminosilicate glass comprising, based on the total number of moles of the components, 68-73 mol % $SiO_2$, 11.5-15 mol % $Al_2O_3$, 2-6 mol % MgO, 2.5-7.5 mol % CaO, 0-3 mol % SrO, 2-7 mol % BaO, 0-4 mol % ZnO, and 0.05-1.5 mol % $TiO_2$.

Preferably, in the alkaline-earth aluminosilicate glass, $SiO_2+Al_2O_3>80$ mol %.

In the composition according to the present invention, preferably, based on the total number of moles of the components, in mole percent, the contents of the components in the composition meet I>0, further preferably is 0.5-50, even further preferably is 0.59-33.85, still further preferably is 0.59-21.6, still more further preferably is 2.07-13.29, wherein the I value is calculated with the following formula:

$$I=[SiO_2-P_1 \times Al_2O_3-P_2 \times BaO-P_3 \times (MgO+ZnO)-P_4 \times (CaO+SrO)-P_5 \times TiO_2] \times 100,$$

Wherein $P_1=4$, $P_2=-2$, $P_3=3.5$, $P_4=3$, and $P_5=-25$, $SiO_2$, $Al_2O_3$, MgO, CaO, SrO, BaO, ZnO, and $TiO_2$ represent the mole percent of the corresponding component in the overall composition respectively.

Preferably, in the alkaline-earth aluminosilicate glass, based on the total number of moles of the components, in mole percent, $0.8 \geq (MgO+BaO)/R'O \geq 0.34$, further preferably $0.75 \geq (MgO+BaO)/R'O \geq 0.45$, even further preferably $0.7 \geq (MgO+BaO)/R'O \geq 0.5$, wherein R'O=MgO+CaO+SrO+BaO+ZnO.

Preferably, in the alkaline-earth aluminosilicate glass, based on the total number of moles of the components, in mole percent, $0.6 \leq Al_2O_3/R'O \leq 1$; further preferably 0.65≤Al$_2$O$_3$/R'O≤0.95; even further preferably 0.7≤Al$_2$O$_3$/R'O≤0.85; still further preferably 0.7≤A$_2$O$_3$/R'O<0.8, wherein R'O=MgO+CaO+SrO+BaO+ZnO.

Preferably, in the alkaline-earth aluminosilicate glass, based on the total number of moles of the components, on an oxide basis, the content of ZnO is 0.4-3 mol %.

Preferably, in the alkaline-earth aluminosilicate glass, based on the total number of moles of the components, on an oxide basis, the content of Al$_2$O$_3$ is 11.7-12.8 mol %.

Preferably, in the alkaline-earth aluminosilicate glass, based on the total number of moles of the components, on an oxide basis, the content of SiO$_2$ is 68-72.2 mol %.

Preferably, in the alkaline-earth aluminosilicate glass, based on the total number of moles of the components, on an oxide basis, the content of MgO is 2.35-5 mol %.

Preferably, in the alkaline-earth aluminosilicate glass, based on the total number of moles of the components, on an oxide basis, the content of CaO is 3.4-7.3 mol %.

Preferably, in the alkaline-earth aluminosilicate glass, based on the total number of moles of the components, on an oxide basis, the content of SrO is 0-2.61 mol %.

Preferably, in the alkaline-earth aluminosilicate glass, based on the total number of moles of the components, on an oxide basis, the content of BaO is 2.3-5.8 mol %.

Preferably, in the alkaline-earth aluminosilicate glass, based on the total number of moles of the components, on an oxide basis, the content of TiO$_2$ is 0.05-1.2 mol %.

Preferably, in the alkaline-earth aluminosilicate glass, the content of the fining agent (preferably is stannous oxide) is 0.04-0.15 mol %.

In a third aspect, the present invention provides a method for preparing alkaline-earth aluminosilicate glass comprising treating the composition for glass according to the present invention by melting, forming, annealing, and machining sequentially.

The specific restrictions on the composition for glass in the method provided in the present invention have been described in the corresponding preceding text, and will not be further detailed here.

In the method provided in the present invention, preferably, the conditions for melting treatment include: temperature: lower than 1,650° C.; time: longer than 1 h. Those skilled in the art can determine the specific melting temperature and melting time according to the actual circumstance. The specific melting temperature and melting time are well known to those skilled in the art, and will not be further detailed here.

In the method provided in the present invention, preferably, the conditions for annealing treatment include: temperature: 790° C. or above; time: longer than 0.1 h. Those skilled in the art can determine the specific annealing temperature and annealing time according to the actual circumstance. The specific annealing temperature and annealing time are well known to those skilled in the art, and will not be further detailed here.

In the method provided in the present invention, there is no particular restriction on the machining. In other words, the machining may be any common machining method in the art. For example, the product obtained through the annealing treatment may be cut, ground, and polished, etc.

Specifically, in the preparation of the glass, first, the raw materials for the composition, which contain components in mole percent of oxides corresponding to the above-mentioned glass substrates, are mixed and stirred to a homogeneous state; then the mixed raw materials processed by melting, the bubbles are expelled and removed by stirring with a platinum rod, and the molten glass is homogenized; next, the temperature is decreased to a range required for glass substrate forming, and a glass substrate is produced in thickness required for flat panel display under an annealing principle; then the formed glass substrate is subject to simple cold-working treatment; finally, the basic physical properties of the glass substrate are tested; thus, an acceptable product is obtained.

In a fourth aspect, the present invention provides alkaline-earth aluminosilicate glass prepared with the method described above.

Preferably, the density of the alkaline-earth aluminosilicate glass according to the present invention is smaller than 2.67 g/cm$^3$.

Preferably, the Young's modulus of the alkaline-earth aluminosilicate glass is greater than 75 GPa.

Preferably, the specific modulus of the alkaline-earth aluminosilicate glass is greater than 29 GPa/(g/cm$^3$).

Preferably, the thermal expansion coefficient of the alkaline-earth aluminosilicate glass at 50-350° C. is smaller than 39×10$^{-7}$/° C.

Preferably, the refractivity $n_D$ of the alkaline-earth aluminosilicate glass is greater than 1.53, further preferably is 1.534-1.545.

Preferably, the forming temperature $T_w$ of the alkaline-earth aluminosilicate glass corresponding to 35,000 P viscosity is lower than 1,320° C.

Preferably, the melting temperature $T_m$ of the alkaline-earth aluminosilicate glass corresponding to 200 P viscosity is lower than 1,650° C.

Preferably, the liquidus temperature $T_l$ of the alkaline-earth aluminosilicate glass is lower than 1,220° C., further preferably is 1,120-1,180° C.

Preferably, the strain point $T_{st}$ of the alkaline-earth aluminosilicate glass is 750° C. or above.

Preferably, the annealing point $T_a$ of the alkaline-earth aluminosilicate glass is 790° C. or above.

Preferably, the glass formation stability factor D of the alkaline-earth aluminosilicate glass is smaller than 1.0, further preferably is 0.5-0.95, even further preferably is 0.59-0.84, even more further preferably is 0.59-0.74, still further preferably is 0.62-0.74, wherein the value D is calculated with the following formula:

$$D=(T_l-T_a)/(T_m-T_l),$$

Wherein $T_m$, $T_l$ and $T_a$ respectively represent the melting temperature, liquidus temperature, and annealing point temperature of the glass corresponding to 200 P viscosity of the glass.

Preferably, the surface tension of the alkaline-earth aluminosilicate glass at 1,200° C. is smaller than 350 mN/m.

Preferably, the Vickers hardness of the alkaline-earth aluminosilicate glass is greater than 6.4 GPa.

Preferably, the number of bubbles having bubble diameter>0.1 mm per Kg glass substrate is so low that the bubbles are invisible.

In a fifth aspect, the present invention provides an application of the composition for glass or alkaline-earth aluminosilicate glass according to the present invention in preparation of a display device and/or solar cell, preferably an application in preparation of a glass substrate material and/or a glass film material for screen surface protection of flat panel display products, a glass substrate material and/or glass material for surface packaging and/or glass film material for screen surface protection of flexible display products, or a glass substrate material of flexible solar cells.

Embodiments

Hereunder the present invention will be detailed in embodiments. In the following embodiments, unless otherwise specified, all of the materials are commercially available, and all of the methods are conventional methods in the art.

In the following Examples and Comparative Examples, the density of glass is measured as per ASTM C-693, in unit of $g/cm^3$.

The thermal expansion coefficient of glass at 50-350° C. is measured with a horizontal dilatometer as per ASTM E-228, in unit of $10^{-7}/°$ C.

The Young's modulus of glass is measured with a material mechanical tester as per ASTM C-623, in unit of GPa.

The Vickers hardness of glass is measured with a Vickers hardness tester as per ASTM E-384, in unit of GPa.

The annealing point and strain point of glass are measured with an annealing point/strain point tester as per ASTM C-336, in unit of ° C.

A viscosity-temperature curve of glass at high temperatures is measured with a rotary high-temperature viscosimeter as per ASTM C-965; wherein the melting temperature corresponding to 200 P viscosity is denoted as $T_m$, in unit of ° C.; the forming temperature corresponding to 35,000 P viscosity is denoted as $T_w$, in unit of ° C.

The upper limit of devitrification temperature (liquidus temperature) of glass is measured through a temperature gradient furnace process as per ASTM C-829.

The surface tension at 1,200° C. is measured with a high-temperature surface tensiometer, in unit of mN/m.

The refractivity $n_D$ at 587.6 nm wavelength (sodium yellow laser) is measured at room temperature with a WAY-2S Abbe digital display refractometer.

The number of bubbles having bubble diameter>0.1 mm per Kg glass substrate refers to the number of bubbles having bubble diameter>0.1 mm in every 1 Kg of alkaline-earth aluminosilicate glass substrate, and is measured with the following method: the weight of sample glass is measured with an electronic balance at 0.01 g accuracy, the quantity of bubbles is counted statistically under an optical microscope, and then the number of bubbles having bubble diameter>0.1 mm per Kg glass is calculated.

Example 1-14 and Comparative Examples 1-13

The components are weighed as indicated in Tables 1-4 and mixed to a homogeneous state, the mixture is poured into a platinum crucible, then the crucible is heated in a resistance oven at 1,620° C. for 4 h, while the mixture is stirred with a platinum rod to expel the bubbles. The molten glass is poured into a stainless steel/cast iron mold and formed into glass product in a specified shape, then the glass product is annealed in an annealing furnace for 2 h, and then the power is turned off and the glass product is cooled in the furnace to 25° C. The glass product is cut, ground and polished, and then washed with deionized water and dried. Thus, a finished glass product meeting the testing requirements is produced. The properties of the glass product are tested respectively. The results are shown in Tables 1-4.

TABLE 1

| | Example 1 | Example 2 | Example 3 | Example 4 | Example 5 | Example 6 | Example 7 |
|---|---|---|---|---|---|---|---|
| $SiO_2$ | 68 | 70.4 | 70.9 | 71.7 | 72.2 | 70.8 | 68.5 |
| $Al_2O_3$ | 12.8 | 12.3 | 12.1 | 12 | 11.7 | 12.55 | 14 |
| $SiO_2 + Al_2O_3$ | 80.8 | 82.7 | 83 | 83.7 | 83.9 | 83.35 | 82.5 |
| MgO | 4.46 | 5 | 3.1 | 3.3 | 4.6 | 2.35 | 3.6 |
| CaO | 5.9 | 3.6 | 7.3 | 6.4 | 5.75 | 3.4 | 3.9 |
| SrO | 0.4 | 0.8 | 2.61 | 0 | 0.3 | 1.3 | 0.7 |
| BaO | 5.8 | 4.4 | 2.3 | 3.4 | 4.9 | 5.7 | 4.8 |
| ZnO | 1.6 | 2.2 | 0.8 | 2 | 0.46 | 3.6 | 3.3 |
| $TiO_2$ | 1 | 1.2 | 0.8 | 1.1 | 0.05 | 0.2 | 1.1 |
| SnO | 0.04 | 0.1 | 0.09 | 0.1 | 0.04 | 0.1 | 0.1 |
| R'O = MgO + CaO + SrO + BaO + ZnO | 18.16 | 16 | 16.11 | 15.1 | 16.01 | 16.35 | 16.3 |
| (MgO + BaO)/R'O | 0.56 | 0.59 | 0.34 | 0.44 | 0.59 | 0.49 | 0.52 |
| $Al_2O_3$/R'O | 0.70 | 0.77 | 0.75 | 0.79 | 0.73 | 0.77 | 0.86 |
| I value | 13.29 | 21.6 | 3.72 | 20.25 | 0.59 | 2.075 | 11.65 |
| density($g/cm^3$) | 2.66 | 2.63 | 2.58 | 2.6 | 2.6 | 2.65 | 2.64 |
| expansion coefficient ($\times 10^{-7}/°7$) | 38.3 | 36.5 | 38.2 | 35.9 | 37.5 | 38.1 | 37.8 |
| Young's modulus(GPa) | 79.6 | 79.2 | 79.3 | 77.6 | 78.7 | 78.8 | 79.5 |
| specific modulus (GPa/($g/cm^3$)) | 29.9 | 30.1 | 30.7 | 29.8 | 30.3 | 29.6 | 30.1 |
| 1200° 2 surface tension (mN/m) | 332.6 | 327.1 | 333.4 | 334.3 | 326.3 | 336.2 | 339.9 |
| Vickers hardness (GPa) | 6.67 | 6.88 | 6.83 | 7.14 | 6.93 | 6.86 | 6.89 |
| number of bubbles having bubble diameter >0.1 mm per Kg glass | 0 | 0 | 0 | 0 | 0 | 0 | 0 |
| $T_m$ (° C.) | 1601.6 | 1647.7 | 1617.3 | 1649.6 | 1647 | 1648.5 | 1631.8 |
| $T_w$ (° C.) | 1244 | 1283.6 | 1272.4 | 1284.1 | 1296 | 1296.5 | 1265.9 |
| $T_l$ (° C.) | 1140 | 1150 | 1160 | 1120 | 1160 | 1130 | 1210 |
| annealing point $T_a$ (° C.) | 809 | 814.6 | 823.3 | 808.6 | 825.9 | 809.6 | 807.5 |
| strain point $T_{st}$ (° C.) | 761 | 766.1 | 775.9 | 765.2 | 778.6 | 762.4 | 764.3 |
| glass stability factor D | 0.72 | 0.67 | 0.74 | 0.59 | 0.69 | 0.62 | 0.95 |
| refractivity $n_D$ | 1.534 | 1.537 | 1.542 | 1.538 | 1.537 | 1.543 | 1.538 |

TABLE 2

|  | Example 8 | Example 9 | Example 10 | Example 11 | Example 12 | Example 13 | Example 14 |
|---|---|---|---|---|---|---|---|
| $SiO_2$ | 69.1 | 69.1 | 70.5 | 71.1 | 71.3 | 72.9 | 69.45 |
| $Al_2O_3$ | 13.5 | 11.6 | 13.9 | 12.4 | 12.45 | 11.5 | 13.9 |
| $SiO_2 + Al_2O_3$ | 82.6 | 80.7 | 84.4 | 83.5 | 83.75 | 84.4 | 83.35 |
| MgO | 6 | 2.8 | 5.25 | 3.8 | 4 | 2.1 | 2.35 |
| CaO | 2.6 | 4.3 | 4 | 4.5 | 5.64 | 4.9 | 3.4 |
| SrO | 3 | 2.4 | 0.6 | 1.5 | 0.4 | 1.7 | 1.3 |
| BaO | 4.7 | 6.7 | 2.8 | 4.3 | 4.5 | 3.7 | 5.7 |
| ZnO | 0.3 | 2.5 | 1.4 | 0.9 | 0.7 | 1.8 | 3.6 |
| $TiO_2$ | 0.7 | 0.5 | 1.5 | 1.4 | 0.9 | 1.3 | 0.2 |
| SnO | 0.1 | 0.1 | 0.05 | 0.1 | 0.11 | 0.1 | 0.1 |
| R'O = MgO + CaO + SrO + BaO + ZnO | 16.6 | 18.7 | 14.05 | 15 | 15.24 | 14.2 | 16.35 |
| (MgO + BaO)/R'O | 0.64 | 0.51 | 0.57 | 0.54 | 0.56 | 0.41 | 0.49 |
| $Al_2O_3$/R'O | 0.81 | 0.62 | 0.99 | 0.83 | 0.82 | 0.81 | 0.85 |
| I value | 3.15 | 9.95 | 20.925 | 30.65 | 18.43 | 33.35 | −4.675 |
| density (g/cm³) | 2.64 | 2.66 | 2.56 | 2.61 | 2.61 | 2.6 | 2.66 |
| expansion coefficient (×$10^{-7}$/° C.) | 38.2 | 38.9 | 32.3 | 37.7 | 37.9 | 31.2 | 38.3 |
| Young's modulus(GPa) | 83.2 | 78.9 | 86.2 | 78.9 | 78.6 | 77.5 | 78.4 |
| specific modulus (GPa/(g/cm³)) | 31.5 | 29.7 | 33.7 | 30.2 | 30.1 | 29.8 | 29.5 |
| 1200° C. surface tension (mN/m) | 330.8 | 331.5 | 338.5 | 330.4 | 331.3 | 332 | 354.7 |
| Vickers hardness (GPa) | 6.61 | 6.41 | 7.04 | 6.87 | 6.85 | 7.12 | 6.81 |
| number of bubbles having bubble diameter >0.1 mm per Kg glass | 0 | 0 | 0 | 0 | 0 | 0 | 0 |
| $T_m$ (° C.) | 1619.7 | 1630.7 | 1622.1 | 1642.8 | 1646 | 1649.8 | 1642.9 |
| $T_w$ (° C.) | 1280.1 | 1253.9 | 1286 | 1286.5 | 1291.5 | 1304.8 | 1356.8 |
| $T_l$ (° C.) | 1170 | 1160 | 1180 | 1200 | 1190 | 1170 | 1270 |
| annealing point $T_a$ (° C.) | 834 | 796.5 | 840.5 | 825.9 | 829.4 | 807.9 | 822.3 |
| strain point $T_{st}$(° C.) | 786 | 764.7 | 792.5 | 778.9 | 783.4 | 769.6 | 755.4 |
| glass stability factor D | 0.75 | 0.77 | 0.77 | 0.84 | 0.79 | 0.75 | 1.20 |
| refractivity $n_D$ | 1.532 | 1.540 | 1.531 | 1.532 | 1.536 | 1.535 | 1.536 |

TABLE 3

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| $SiO_2$ | 68 | 68 | 68 | 68 | 71.7 | 69.25 | 69.8 |
| $Al_2O_3$ | 10.8 | 12.8 | 12.8 | 15.8 | 12.5 | 14.1 | 14.8 |
| $SiO_2 + Al_2O_3$ | 78.8 | 80.8 | 80.8 | 83.8 | 84.2 | 83.35 | 84.6 |
| MgO | 4.46 | 4.46 | 4.46 | 3.46 | 3.0 | 4.2 | 4.3 |
| CaO | 6.9 | 5.9 | 5.9 | 4.9 | 4.2 | 5.3 | 4.6 |
| SrO | 1.4 | 1.4 | 5.8 | 0.4 | 1.6 | 2.6 | 0.7 |
| BaO | 5.8 | 5.8 | 0.4 | 4.8 | 2.9 | 1.8 | 5.3 |
| ZnO | 1.6 | 1.6 | 1.6 | 1.6 | 4.0 | 2.7 | 0.4 |
| $TiO_2$ | 1 | 0 | 1 | 1 | 0 | 0 | 0 |
| SnO | 0.04 | 0.04 | 0.04 | 0.04 | 0.10 | 0.05 | 0.10 |
| R'O = MgO + CaO + SrO + BaO + ZnO | 20.16 | 19.16 | 18.16 | 15.16 | 15.7 | 16.6 | 15.3 |
| (MgO + BaO)/R'O | 0.51 | 0.54 | 0.27 | 0.54 | 0.38 | 036 | 0.63 |
| $Al_2O_3$/R'O | 0.54 | 0.67 | 0.70 | 1.04 | 0.80 | 0.85 | 0.97 |
| I value | 15.29 | −14.71 | −13.71 | 5.79 | −14.4 | −31.4 | −11.15 |
| density (g/cm³) | 2.69 | 2.68 | 2.59 | 2.61 | 2.61 | 2.59 | 2.63 |
| expansion coefficient (×$10^{-7}$/° C.) | 42 | 39.9 | 37.1 | 36.4 | 34.3 | 35.6 | 37.0 |
| Young's modulus (GPa) | 79.5 | 79.7 | 81.0 | 79.4 | 79.2 | 81.7 | 81.5 |
| specific modulus (GPa/(g/cm³)) | 29.5 | 29.7 | 31.3 | 30.4 | 30.3 | 31.5 | 31.0 |
| 1200° C. surface tension (mN/m) | 338.9 | 357.4 | 336.5 | 413.1 | 359.7 | 364.5 | 360.3 |
| Vickers hardness (GPa) | 6.28 | 6.54 | 6.61 | 6.85 | 6.49 | 6.30 | 6.15 |

TABLE 3-continued

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| number of bubbles having bubble diameter >0.1 mm per Kg glass | 0 | 0 | 0 | 5 | 1 | 4 | 2 |
| $T_m$ (° C.) | 1595.5 | 1603.8 | 1623.4 | 1613.7 | 1613 | 1618 | 1638 |
| $T_w$ (° C.) | 1221.4 | 1233.4 | 1236.0 | 1277.6 | 1295.4 | 1271.4 | 1321.2 |
| $T_l$ (° C.) | 1150 | 1230 | 1260 | 1290 | 1110 | 1120 | 1110 |
| annealing point $T_a$ (° C.) | 778.3 | 794.2 | 800.4 | 835.6 | 812 | 819 | 821 |
| strain point $T_{st}$ (° C.) | 727.3 | 741.1 | 752.6 | 784.7 | 752 | 746 | 757 |
| glass stability factor D | 0.83 | 1.17 | 1.26 | 1.40 | 0.59 | 0.60 | 0.55 |
| refractivity $n_D$ | 1.538 | 1.513 | 1.533 | 1.532 | 1.525 | 1.521 | 1.519 |

TABLE 4

| | Comparative Example 8 | Comparative Example 9 | Comparative Example 10 | Comparative Example 11 | Comparative Example 12 | Comparative Example 13 |
|---|---|---|---|---|---|---|
| $SiO_2$ | 68.83 | 72.5 | 70.1 | 70.8 | 70.8 | 69.1 |
| $Al_2O_3$ | 15.6 | 13.3 | 13.5 | 12.55 | 12.55 | 11.6 |
| $SiO_2 + Al_2O_3$ | 84.43 | 85.8 | 83.6 | 83.35 | 83.35 | 80.7 |
| MgO | 6.2 | 3.6 | 2.1 | 2.35 | 2.35 | 2.8 |
| CaO | 3.6 | 5.0 | 3.5 | 3.4 | 3.4 | 4.3 |
| SrO | 2.0 | 2.6 | 3.3 | 1.3 | 1.3 | 2.4 |
| BaO | 1.3 | 2.1 | 3.7 | 5.7 | 5.7 | 6.7 |
| ZnO | 2.4 | 0.8 | 3.7 | 3.6 | 3.6 | 2.5 |
| $TiO_2$ | 0 | 0 | 0 | 0 | 0 | 0 |
| $ZrO_2$ | 0 | 0 | 0 | 0.2 | 0 | 0 |
| PbO | 0 | 0 | 0 | 0 | 0.2 | 0 |
| SnO | 0.07 | 0.10 | 0.10 | 0.1 | 0.1 | 0.1 |
| $La_2O_3$ | 0 | 0 | 0 | 0 | 0 | 0.5 |
| R'O = MgO + CaO + SrO + BaO + ZnO | 15.5 | 14.1 | 16.3 | 16.35 | 16.35 | 18.7 |
| (MgO + BaO)/R'O | 0.48 | 0.40 | 0.36 | 0.49 | 0.49 | 0.51 |
| $Al_2O_3$/R'O | 1.01 | 0.94 | 0.83 | 0.77 | 0.77 | 0.62 |
| I value | −37.87 | −14.7 | −17.2 | 2.075 | 2.075 | −2.55 |
| density(g/cm³) | 2.55 | 2.55 | 2.63 | 2.65 | 2.68 | 2.70 |
| expansion coefficient (×10⁻⁷/° C.) | 32.0 | 33.4 | 37.2 | 37.7 | 39.2 | 40.1 |
| Young's modulus(GPa) | 83.3 | 81.1 | 79.0 | 78.9 | 77.5 | 79.5 |
| specific modulus (GPa/(g/cm³)) | 32.6 | 31.8 | 30.0 | 29.8 | 28.9 | 29.4 |
| 1200° C. surface tension (mN/m) | 364.2 | 358.7 | 363.6 | 360.7 | 333.8 | 346.7 |
| Vickers hardness (GPa) | 6.44 | 6.37 | 6.17 | 6.89 | 6.49 | 6.26 |
| number of bubbles having bubble diameter >0.1 mm per Kg glass | 3 | 1 | 1 | 2 | 0 | 0 |
| $T_m$ (° C.) | 1640 | 1635 | 1633 | 1657.5 | 1607.3 | 1618.7 |
| $T_w$ (° C.) | 1283.8 | 1329.6 | 1290.4 | 1316.5 | 1265.3 | 1271.1 |
| $T_l$ (° C.) | 1140 | 1120 | 1130 | 1290 | 1240 | 1240 |
| annealing point $T_a$ (° C.) | 833 | 816 | 826 | 816.3 | 787.8 | 823.3 |
| strain point $T_{st}$ (° C.) | 758 | 747 | 753 | 768.6 | 731.6 | 775.1 |
| glass stability factor D | 0.61 | 0.59 | 0.60 | 1.29 | 1.23 | 1.10 |
| refractivity $n_D$ | 1.527 | 1.519 | 1.528 | 1.540 | 1.547 | 1.544 |

It is seen from the results in Tables 1-4: when the composition for glass that contains $SiO_2$, $Al_2O_3$, MgO, CaO, SrO, BaO, ZnO and $TiO_2$ in specific contents in the present invention is used to prepare glass, especially in the case that the content of $SiO_2+Al_2O_3$ is >80 mol %, the I value is >0, 0.8≥(MgO+BaO)/R'O≥0.34, and 0.6≤$Al_2O_3$/R'O≤1 (in mole percent) in the composition for glass, the prepared glass has excellent properties, such as higher strain point, higher Young's modulus, higher specific modulus, higher Vickers hardness, higher chemical stability, higher stability of glass formation, lower forming temperature, lower melting temperature, and lower liquidus temperature, etc. Specifically, the density of the obtained alkaline-earth aluminosilicate glass is smaller than 2.67 g/cm³, the Young's modulus is greater than 75 GPa, the specific modulus is greater than 29 GPa/(g/cm³), the thermal expansion coefficient at 50-350° C. is smaller than 39×10⁻⁷/° C., the refractivity $n_D$ is greater than 1.53, the forming temperature $T_w$ corresponding to 35,000 P viscosity is lower than 1,320° C., the melting temperature $T_m$ corresponding to 200 P viscosity is lower than 1,650° C., the liquidus temperature $T_l$ is lower than 1,220° C., the strain point $T_{st}$ is 750° C. or above, the annealing point $T_a$ is 790° C. or above, the glass formation stability factor D is smaller than 1.0, the surface tension at 1,200° C. is smaller than 350 mN/m, the Vickers hardness is greater than 6.4 GPa, and the number of bubbles having bubble diameter>0.1 mm per Kg glass substrate is so low that the bubbles are invisible.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A composition for glass comprising, based on the total number of moles of the components, on an oxide basis, 68-73 mol % $SiO_2$, 11.5-15 mol % $Al_2O_3$, 2-6 mol % MgO, 2.5-7.5 mol % CaO, 0-3 mol % SrO, 2-7 mol % BaO, 0-4 mol % ZnO, and 0.05-1.5 mol % $TiO_2$;

Wherein based on the total number of moles of the components, the contents of the components calculated in mole percent in the composition meet I>0, wherein the I value is calculated with the following formula:

$$I=[SiO_2-P_1 \times Al_2O_3-P_2 \times BaO-P_3 \times (MgO+ZnO)-P_4 \times (CaO+SrO)-P_5 \times TiO_2] \times 100,$$

wherein $P_1=4$, $P_2=-2$, $P_3=3.5$, $P_4=3$, and $P_5=-25$, $SiO_2$, $Al_2O_3$, MgO, CaO, SrO, BaO, ZnO, and $TiO_2$ represent the mole percent of the corresponding component in the overall composition respectively.

2. The composition of claim 1, wherein based on the total number of moles of the components, on an oxide basis, the content of ZnO is 0.4-3 mol %, the content of $Al_2O_3$ is 11.7-12.8 mol %,
the content of $SiO_2$ is 68-72.2 mol %,
the content of MgO is 2.35-5 mol %,
the content of CaO is 3.4-7.3 mol %,
the content of SrO is 0-2.61 mol %,
the content of BaO is 2.3-5.8 mol %, and
the content of $TiO_2$ is 0.05-1.2 mol %.

3. The composition of claim 1, further containing a fining agent; based on the total number of moles of the components, on an oxide basis, the content of the fining agent is 0.04-0.15 mol %.

4. The composition of claim 3, wherein the fining agent is at least one of sulfate, nitrate, stannic oxide, stannous oxide, chloride, and fluoride.

5. The composition of claim 1, wherein based on the total number of moles of the components, on an oxide basis, $SiO_2+Al_2O_3>80$ mol %.

6. The composition of claim 1, wherein based on the total number of moles of the components, in mole percent, 0.8≥(MgO+BaO)/R'O≥0.34, wherein R'O=MgO+CaO+SrO+BaO+ZnO.

7. The composition of claim 6, wherein 0.7≥(MgO+BaO)/R'O≥0.5.

8. The composition of claim 1, wherein based on the total number of moles of the components, in mole percent, 0.6≤$Al_2O_3$/R'O≤1, wherein R'O=MgO+CaO+SrO+BaO+ZnO.

9. The composition of claim 8, wherein 0.7<$Al_2O_3$/R'O<0.8.

10. The composition of claim 1, wherein I is 0.5-50.

11. The composition of claim 10, wherein I is 2-13.5.

12. A method for preparing alkaline-earth aluminosilicate glass comprising treating the composition for glass of claim 1 by melting, forming, annealing, and machining sequentially.

13. Alkaline-earth aluminosilicate glass prepared with the method of claim 12, wherein the density of the alkaline-earth aluminosilicate glass is smaller than 2.67 g/cm³, the Young's modulus is greater than 75 GPa, the specific modulus is greater than 29 GPa/(g/cm³), and the refractivity nD is greater than 1.53.

14. The alkaline-earth aluminosilicate glass of claim 13, wherein the thermal expansion coefficient at 50-350° C. is smaller than 39×10⁻⁷/° C., the forming temperature $T_w$ corresponding to 35,000 P viscosity is lower than 1,320° C., the melting temperature $T_m$ corresponding to 200 P viscosity is lower than 1,650° C., the liquidus temperature $T_l$ is lower than 1,220° C., the strain point $T_{st}$ is 750° C. or above, and the annealing point $T_a$ is 790° C. or above.

15. The alkaline-earth aluminosilicate glass of claim 13, wherein the surface tension at 1,200° C. is smaller than 350 mN/m, the Vickers hardness is greater than 6.4 GPa, and the number of bubbles having bubble diameter>0.1 mm per Kg glass substrate is so low that the bubbles are invisible.

16. The alkaline-earth aluminosilicate glass of claim 13, wherein the glass formation stability factor D is smaller than 1.0, wherein the value D is calculated with the following formula:

$$D=(T_l-T_a)/(T_m-T_l),$$

wherein $T_m$, $T_l$ and $T_a$ respectively represent the melting temperature, liquidus temperature, and annealing point temperature of the glass corresponding to 200 P viscosity of the glass.

17. The alkaline-earth aluminosilicate glass of claim 16, wherein the glass formation stability factor D is 0.62-0.74.

18. A method for preparing a display device and/or solar cell comprising providing the composition for glass of claim 1.

19. The method of claim 18, further comprising apply the composition for glass as a glass substrate material and/or a glass film material for screen surface protection of flat panel display products, a glass substrate material and/or glass material for surface packaging and/or glass film material for screen surface protection of flexible display products, or a glass substrate material of flexible solar cells.

* * * * *